Nov. 1, 1955 L. ARNOLDY 2,722,246
SAFETY GUARDS FOR POWER SAWS
Filed May 22, 1953 2 Sheets-Sheet 1

INVENTOR.
LEO ARNOLDY
BY
ATTORNEY

Nov. 1, 1955
L. ARNOLDY
2,722,246
SAFETY GUARDS FOR POWER SAWS
Filed May 22, 1953
2 Sheets-Sheet 2
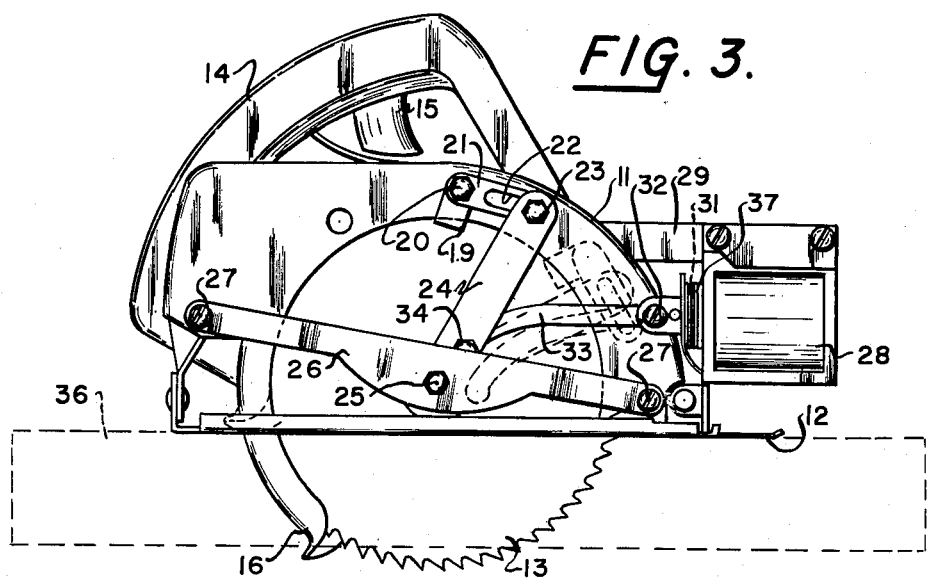
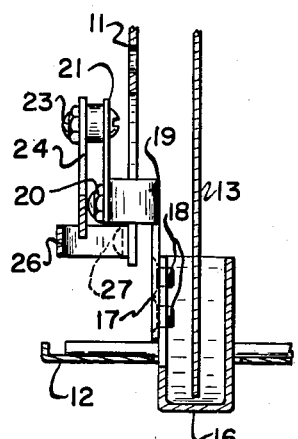
INVENTOR.
LEO ARNOLDY
BY
ATTORNEY

United States Patent Office 2,722,246
Patented Nov. 1, 1955

2,722,246

SAFETY GUARDS FOR POWER SAWS

Leo Arnoldy, Denver, Colo.

Application May 22, 1953, Serial No. 356,677

5 Claims. (Cl. 143—159)

This invention relates to a saw guard for circular saws, and while more particularly applicable to portable saws of the "Skil Saw" type, it will be found equally valuable on any type of circular saw, either portable or stationary.

The principal object of the invention is to provide means for automatically withdrawing a saw guard from the saw blade when the motor driving the saw is started so that the teeth may be brought into contact with the work and to provide means for automatically returning the guard to its guarding position the instant the current to the drive motor is cut off, so that the saw will be protected during its coasting period.

Another object is to so construct the guard-withdrawing device that it will not interfere with the usual movement of the guard when the latter is in contact with the work.

A further object is to provide a saw guard retracting device which can be quickly and easily attached to present saws of the types having retractable saw guards.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is a similar side view, illustrating, in solid line, the saw guard retracted by the invention to the work-initiating position, and in broken line the saw guard forced to a more retracted position by contact with the work being sawed; and Fig. 4 is an enlarged, detail section, taken on the line 4—4, Fig. 2.

Figure 1:
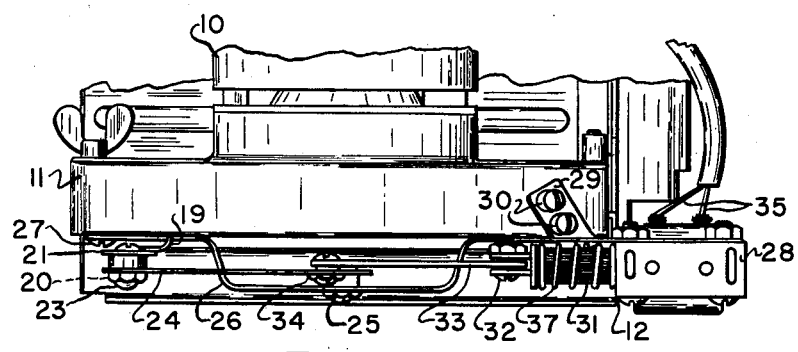
Fig. 1 is a fragmentary plan view, illustrating the saw blade extremity of a conventional portable circular saw of a type having a retractable saw guard illustrating the invention applied thereto.

In the drawing, parts of a conventional portable saw are designated by numeral as follows: drive motor 10, saw hood 11, saw table 12, circular saw blade 13, handle 14, motor-starting switch 15 and saw guard 16. In the conventional portable saw, the saw guard 16 is mounted to rotate about the axis of the shaft of the motor 10 and extends radially, in a sector shape, from its mounting and in spaced relation to the rear face of the saw 13, thence extends forwardly about the circumference and inwardly over the periphery of the forward face of said saw to prevent accidental contact with the saw teeth. In the usual saw the guard is normally held in the guarding position of Fig. 2 by means of a suitable spring surrounding the motor shaft. It is intended to be forced away from the guarding position by bringing the work to be sawed into contact with the guard to push the latter away from the saw.

However, when the saw is being used on roof sheathing, flooring and for other surface work, it is necessary to push the guard back by hand before the saw can be lowered into the work. This is a tedious, time-consuming and dangerous task. This invention is designed to automatically retract the saw guard 16 from a position below the teeth so that the teeth of the rotating saw may be safely lowered into contact with the work and so that the guard may then be pushed upwardly by he work as the depth of the cut increases. It is also designed to allow the guard 16 to return to the guarding position the instant the current to the motor 10 is shut off so that accidental contact with the idling or coasting saw is prevented.

The invention comprises a bracket member 17 which is secured to the saw guard 16 adjacent the upper extremity of the latter and partially within the enclosure of the hood 11 by means of suitable attachment screws 18. The bracket member 17 extends beyond the extremity of the saw guard 16 and is provided at its extremity with an arm 19 which is bent in a U-shape so as to extend around the inner edge of the saw hood 11, thence radially outward in spaced relation to the outer face of the hood.

A suspension link 21 is hingedly suspended from a hinge bolt 20 mounted in the arm 19 of the bracket member 17. The suspension link 21 is provided with an elongated slotted opening 22 in which a lever bolt 23, carried in the extremity of a lever arm 24 is positioned.

The lever arm 24 is pivotally mounted on a pivot bolt 25 affixed in a cross bar 26. The cross bar 26 is mounted on the front face of the two lower extremities of the saw hood 11 by means of suitable cap screws 27 and extends diametrically of the saw to support the pivot bolt 25 in exact alignment with the saw axis. The lever arm 24 is actuated by means of an electric solenoid 28 mounted on a solenoid bracket 29 which is secured to the saw hood 11 by means of suitable cap screws 30.

Electric current is conducted to the solenoid 28 through suitable electrical conductors 35 which are connected to the feed terminals of the motor 10 so that the solenoid will be energized simultaneously with the motor 10.

The solenoid 28 is of a conventional variety designed to attract an armature plunger 31, the extremity of which is connected by means of a wrist pin 32 with an arcuate connecting rod 33. The connecting rod 33 is connected with the lever arm 24, adjacent the pivot bolt 25, through the medium of a crank bolt 34. Thus, when the solenoid is energized, it will swing the saw guard in a retracting direction. The guard is urged in a guarding direction by the conventional guard spring or if the latter is not present, by a spring 37 mounted on the solenoid plunger.

Figure 2:
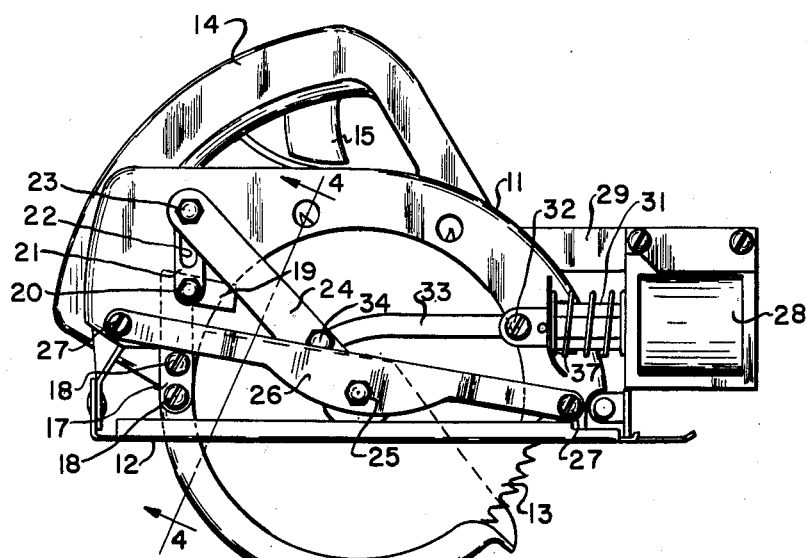
Fig. 2 is a side view of the saw of Fig. 1, illustrating the saw guard in the guarding position.

Let us assume that the saw guard 16 is in the guarding position of Fig. 2 and that it is desired to saw into a timber surface, such as indicated in broken line at 36. The motor switch 15 is closed to close an electric circuit to both the motor 10 and the solenoid 28. The result is that the armature plunger 31 is instantly attracted, causing the connecting rod 33 to swing the lever 24 so that the link 21 will draw upon the arm 19 of the bracket 17 so as to swing the guard 16 to the solid line position of Fig. 3 to expose the teeth of the saw blade 13.

The blade 13 is now brought into contact with the timber 36 and as the saw enters the timber, the surface of the latter will force the guard 16 further upward until the timber reaches the preset depth position of the saw table 12. As the guard 16 is forced circumferentially around the axis of the saw by the timber, the lever arm 24 will move therewith, the crank bolt 34 swinging circumferentially around the axis as shown in broken line in Fig. 3.

If still further saw depth is desired, the guard 16 can be forced still further around the saw blade after the lever arm 24 has reached its farthest position. This is accomplished by the slotted opening 22 which allows the link 21 to travel forwardly on the lever bolt 23, as shown in broken line in Fig. 3.

When the work has been completed, the saw blade is removed from the work, the motor switch 15 is actuated to open the circuit to both the motor and the solenoid 28. This deenergizes the solenoid and allows the spring 37 to snap the guard back to the guarding position of Fig. 2 so as to prevent accidental contact with the teeth of the saw blade while the latter is idling to a stop.

The same invention could be applied to a stationary saw of the table type, which would simply mean a reversal of the position shown in Figs. 2 and 3, with the saw projecting upwardly from the table 12 and the solenoid positioned below the table. The guard would then travel upwardly over the saw instead of downwardly as illustrated.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A saw guard for saws of the type having a hood partially surrounding the upper portion of a circular saw mounted on a motor shaft comprising: a cross bar secured at its extremities to said hood and extending diametrically across the forward face of said saw; a pivot member supported by said cross bar in axial alignment with the axis of said motor shaft; a sector-shaped saw guard rotatably mounted about said shaft and extending radially in spaced relation to the rear face of said saw and about the teeth of the latter for a portion of its circumference; a lever arm pivoted at its one extremity on said pivot member; means connecting the other extremity of said lever arm to said saw guard; a solenoid mounted on said hood; a plunger extending from said solenoid; a connecting rod connecting said plunger to said lever arm for swinging said saw guard in one direction; and spring means for swinging said lever arm in the other direction.

2. A saw guard as described in claim 1 having a bracket member mounted on said saw guard and extending to the exterior of said hood; and a connecting link connecting said bracket member to said lever arm.

3. A saw guard as described in claim 2 in which the connecting link is provided with a slotted opening engaging a member on said lever arm so that said bracket member may move relative to said lever arm to allow said saw guard to be moved manually beyond the limit of movement of said solenoid.

4. A retracting device for a motor driven circular saw of the type having a fixed saw hood about the upper periphery of said saw and a movable saw guard pivoted about the shaft of said saw and extending radially from said shaft in spaced relation to the rear face of said saw, thence forwardly about the lower periphery of said saw, thence radially inward about the periphery of the forward face of said saw, to prevent accidental contact with the teeth thereof, comprising: a cross bar fixedly secured to said hood and extending across the forward face of said saw; a pivot member mounted on said cross bar in axial alignment with the axis of said saw; a lever arm pivoted at its one extremity on said pivot member and extending radially in spaced relation to the forward face of said saw; connecting means suspending said movable saw guard from the other extremity of said lever arm; a solenoid mounted on said hood; an armature plunger in said solenoid; and a connecting rod secured at its extremities to said lever arm and said armature plunger so that when said solenoid is energized, said plunger will be actuated to retract said movable saw guard into said hood.

5. A retracting device for a saw guard as described in claim 4 in which the solenoid is electrically connected to the current supply to said motor driven saw so that said solenoid will be energized simultaneously with the motor driving said saw.

References Cited in the file of this patent

UNITED STATES PATENTS

| | | |
|---|---|---|
| 1,102,018 | Dodds | June 30, 1914 |
| 1,738,896 | Hansen | Dec. 10, 1929 |
| 2,091,647 | Nicholson | Aug. 31, 1937 |
| 2,342,052 | Jimerson et al. | Feb. 15, 1944 |
| 2,657,719 | Forsberg | Nov. 3, 1953 |
| 2,659,399 | Doug | Nov. 17, 1953 |